Sept. 9, 1930.  P. P. PIPES  1,775,441
SUPPORT FOR RESISTANCE ELEMENTS
Filed March 23, 1927
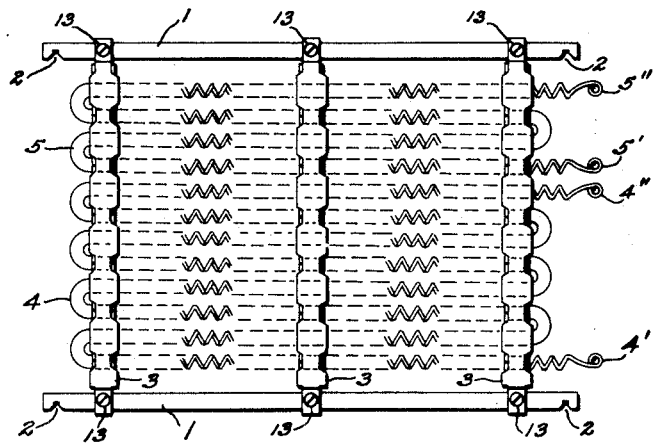
FIG. 1.
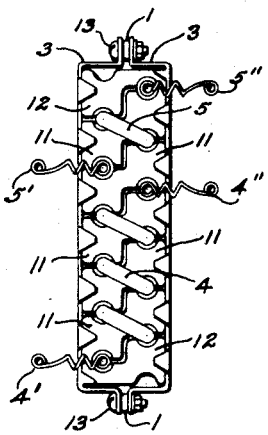
FIG. 2.
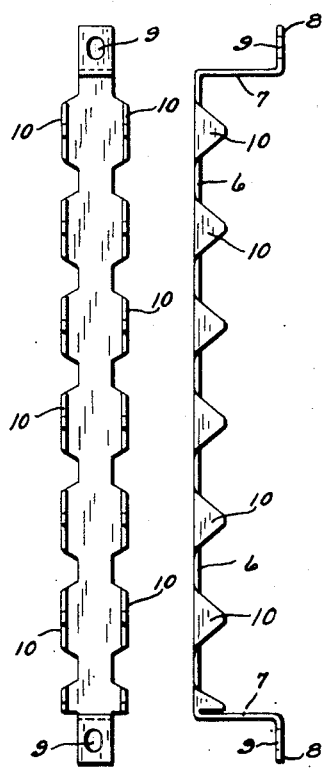
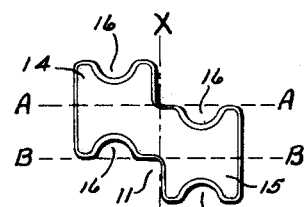
FIG. 5.
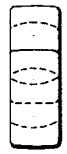
FIG. 6.
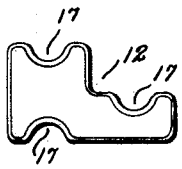
FIG. 7.
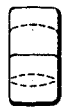
FIG. 8.
FIG. 9.
FIG. 4.  FIG. 3.
H. J. Stromberger
PLINY P. PIPES
Inventor
By
Attorney Patented Sept. 9, 1930

1,775,441

UNITED STATES PATENT OFFICE

PLINY P. PIPES, OF MANSFIELD, OHIO, ASSIGNOR TO THE OHIO BRASS COMPANY, OF MANSFIELD, OHIO, A CORPORATION OF NEW JERSEY

SUPPORT FOR RESISTANCE ELEMENTS   REISSUED

Application filed March 23, 1927. Serial No. 177,641.

My invention relates to a resistance unit, and is particularly adapted for use in connection with the construction of portable electric welding machines due to its light construction, ease of repair and compactness, although it may also be used with other devices requiring resistance units or elements.

My invention resides in the new and novel construction, combination and relation of the various parts more fully disclosed and described hereinafter.

In the accompanying drawing:

Fig. 1 is a plan view of my invention.

Fig. 2 is an end view of the same.

Fig. 3 is a side view of one of the side plates used in pairs.

Fig. 4 is an edge view of Fig. 3, looking toward the inner edge.

Fig. 5 is a side view of one of the intermediate insulating elements.

Fig. 6 is an edge view of Fig. 5.

Fig. 7 is a side view of the end insulating elements.

Fig. 8 is an edge view of Fig. 7.

Fig. 9 shows a section of a modified shape which can be used for that shown in Fig. 4.

In the preferred embodiment of my invention, I employ two supporting bars 1 made of metal preferably, although insulating material, such as fiber, may be employed, if desired, and these bars are spaced apart and provided with notches 2 at the ends, which may hook over bolts, pins, etc., in the supporting frame of the machine to which it is applied to assist in the assembly of the units in the frame.

Secured to the supporting bars 1 are the supports for the resistance elements 4 and 5. The resistance elements may consist of one or more sections, and in this case I have shown two sections 4 and 5, having terminals 4' and 4" and 5' and 5" respectively.

The resistance elements 4 and 5 I have shown as comprising wire, helically or spirally wound, which gives a large resistance capacity for a given space occupied, and is easy and convenient to handle. Each length of resistance element across the device can be a separate unit connected at the end, but I prefer to make the elements continuous in length as far as possible, thereby eliminating possible points of trouble where the lengths are connected together.

Each resistance support comprises two side plates 3 which may be formed up out of sheet metal, such as steel or iron with a portion 6 and projections 7 extending at right angles to the portion 6 and projections 8 extending at right angles to the portions 7, and each projection 8 provided with a hole 9. The portion 6 is provided with inwardly projecting, spaced and oppositely disposed lips 10, forming a groove therebetween along the inner face of the portion 6 to receive and hold the insulating blocks 11 and 12. If desired, the opposite edges of the portion 6 may be turned throughout its length to form a groove.

The side plate may be formed up out of a small channel, if desired. The bar 1 is provided with transverse holes, which are adapted to receive the screws or small bolts 13, which pass through the holes 9 in the side plates and secure the side plates in position on the supporting bars 1 and disposed on opposite sides thereof. The two side plates form a frame on which are mounted the insulating blocks 11 and 12.

The insulating block 12 is made of glass, porcelain or, preferably, clay, which has been fired, and is of a shape which, I find, will permit of close spacing of the coils of the resistance elements 4 and 5 and allow ample space between the coils or layers of the resistance elements to permit of circulation of air to keep down the temperature of the resistance elements.

Each insulating block consists of two portions 14 and 15 on opposite sides of the center line X—X. The upper and lower edge faces of the portions 14 and 15 are "stepped" or offset or out of alinement with the corresponding face of the other portion and in the block shown in Fig. 5 the upper edge face of the portion 15 coincides with the transverse line A—A which is midway of the portion 14, and the lower face of the portion 14 is on the transverse line B—B, which is midway of the portion 15.

It will be noted that the members 6, 7 and 9 hold the insulating blocks against lateral, longitudinal and transverse displacement respectively.

This construction permits of two blocks being placed edge to edge, as shown in Fig. 2, and the adjacent faces are provided with semi-grooves 16 which, cooperating with similar grooves on the cooperating block form a substantially circular groove, in which rests the resistance elements 4 and 5, and the surface forming the grooves are convexed so as to offer as little contact with the resistance coils as possible and thereby giving better cooling effect and less danger of "hot-spots" in the coils.

Any number of blocks may be assembled in the groove formed in the supporting side plates, and in order to make use of the semi-grooves 16 in the upper and lower faces of the end blocks, as assembled in the side plates, I employ a form of insulating block 12 shown in Fig. 7, which is similar to that shown in Fig. 5, excepting that the lower part of the portion 15 below the line B—B is removed and the grooves 17 cooperate with the grooves 16 to make complete retaining grooves for the resistance element.

The construction and assembly of the insulating blocks 11 and 12 is such as to produce orifices to receive the resistance elements in spaced relation to each other, both horizontally and vertically.

From the construction shown and described, it will be readily appreciated that the construction permits of forming a unit as shown in Fig. 1, of which one or more can be used in a suitable frame, and which are independent of each other and can be removed quite readily, as a unit, from the frame. The unit shown in Fig. 1 consists of the three resistance element supports mounted on the bars 1. It will be noted that each resistance support is removable independent of the other support or supports by removing the screws 13. If desired, the side plates can be arc-welded to the bars, but would be non-removable. This independence of the units and the resistance element supports permits of easy assembly and construction and also ease in removal and replacing any of the individual parts should it be desired to make repairs to the completed device.

The insulating blocks 11 and 12 can be incorporated into a single unit block if desired, but in that case the resistance element would be pushed and pulled through the holes therein in installing, and under some conditions would not be as convenient as the separately formed blocks, but would be quite convenient where a bar resistance element was used. To apply the section shown in Fig. 9, it is only necessary to form the edges of the insulating blocks 11 and 12 with grooves corresponding to the projecting lip.

It will be noted in Fig. 2 that the insulating blocks 11 and 12 are spaced apart slightly, which permits of sufficient freedom between the blocks to prevent binding under contraction or expansion, for it will be recognized that in a device of this sort the blocks are subjected to a very high degree of heat, as the resistance elements 4 and 5 very often reach a red heat and not infrequently a bright red heat. The slight space between the blocks, as shown in Fig. 2, has another advantage, in that it permits the removal of any one of the blocks 11 or 12 without the necessity of removing the adjacent block or blocks. If one or more blocks should become broken, it is only necessary to remove the entire unit, as shown in Fig. 1, from the supporting frame and to lay the same horizontally upon a table or bench and then remove the upper side plate 3. Any one of the insulating blocks 11 or 12 can then be removed by pushing the balance of the blocks toward one or both ends of the remaining side frame so as to allow all slack adjacent the block to be removed. This, I find, is sufficient. The slack referred to between the blocks and slight manipulation of the blocks, I find, is sufficient to permit any one of the blocks to be removed without the necessity of removing the adjacent blocks or disturbing the resistance elements 4 or 5.

There will be modifications to the disclosure herein made, which will be apparent to those skilled in the art, and, therefore, I do not wish to be limited other than by my claims.

I claim:

1. A support for a resistance element comprising a plurality of insulating blocks having flat faces and two of its oppositely disposed edges being "stepped", a half groove in each "stepped" face, the surface of the groove being convexed to limit contact with the resistance element, metallic members to hold the blocks against lateral, longitudinal and transverse displacement with limited longitudinal movement and means to hold the metallic members in fixed relation.

2. A support for a resistance element comprising a plurality of insulating blocks forming an elongated structure and each block having flat edges and two of its oppositely disposed edges being "stepped", a half groove in the face of each "stepped" edge and having limited contact with the resistance element, oppositely disposed metallic members to encircle the exterior edges of the blocks to hold them against lateral, transverse and longitudinal displacement and means to hold the metallic members in fixed relation.

3. A support for a resistance element comprising a plurality of insulating blocks having edges and two of its oppositely disposed edges being "stepped", a half groove in each "stepped" edge to receive the resistance element, oppositely disposed members formed up of sheet metal with spaced projections to form a groove to receive the insulating blocks and hold them against lateral and transverse displacement and having inwardly projecting means at the ends of the members to prevent longitudinal displacement of the blocks and means to secure the members together in fixed relation.

4. A support for a resistance element comprising a plurality of cooperating insulating blocks having flat faces and two of its oppositely disposed edges being "stepped" and a half groove in the face of each "step" to cooperate with the half groove in the face of each "step" in one of the cooperating blocks to form a substantially complete circular groove to receive and retain the resistance element and channeled means to receive oppositely disposed edges of the blocks to hold the blocks in assembled relation and means to hold the channeled means in fixed relation.

5. An insulated support comprising a pair of spaced and channeled members forming an elongated recess with the groove of each member facing that of the other member, means to hold the members in fixed relation and a plurality of insulating blocks positioned within the recess and grooves and locked thereby against longitudinal and transverse movement, some of the blocks having two oppositely disposed "stepped" edges and each step of each edge having a half groove to cooperate with the half groove in the edge of the adjacent block to receive a resistance element.

In testimony whereof I affix my signature.

PLINY P. PIPES.